(12) United States Patent
Han et al.

(10) Patent No.: US 7,126,789 B2
(45) Date of Patent: Oct. 24, 2006

(54) LOW DC COIL RESISTANCE PLANAR WRITER

(75) Inventors: Cherng Chyi Han, San Jose, CA (US); Mao-Min Chen, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 573 days.

(21) Appl. No.: 10/633,133

(22) Filed: Aug. 1, 2003

(65) Prior Publication Data
US 2005/0024770 A1    Feb. 3, 2005

(51) Int. Cl.
*G11B 5/147* (2006.01)
(52) U.S. Cl. .................................. 360/126
(58) Field of Classification Search ............ None
See application file for complete search history.

(56) References Cited

U.S. PATENT DOCUMENTS

| 6,262,867 | B1 | 7/2001 | Sano et al. | 360/126 |
| 6,385,009 | B1 | 5/2002 | Sano et al. | 360/126 |
| 6,490,131 | B1 | 12/2002 | Sano et al. | 360/126 |

*Primary Examiner*—Hoa T. Nguyen
*Assistant Examiner*—Mark Blouin
(74) *Attorney, Agent, or Firm*—Saile Ackerman LLC; Stephen B. Ackerman

(57) ABSTRACT

Present processes used for planarizing a cavity filled with a coil and hard baked photoresist require that a significant amount of the thickness of the coils be removed. This increases the DC resistance of the coil. In the present invention, CMP is terminated as soon as the coils are exposed, allowing their full thickness to be retained and resulting in minimum DC resistance. Application of this process to the manufacture of a planar magnetic write head is described.

29 Claims, 4 Drawing Sheets

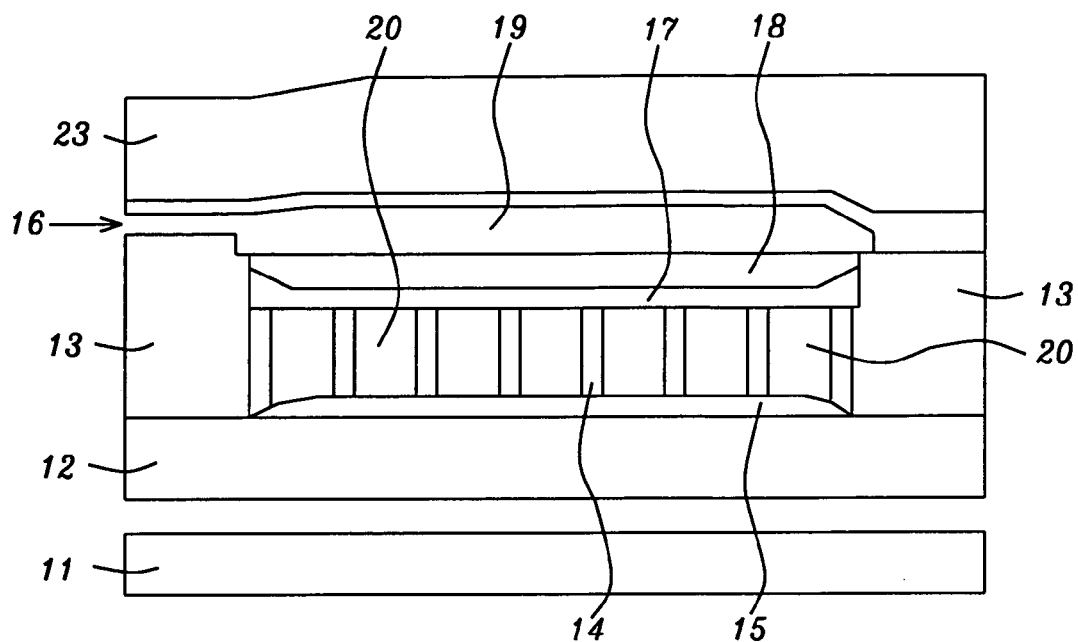
FIG. 1 – Prior Art
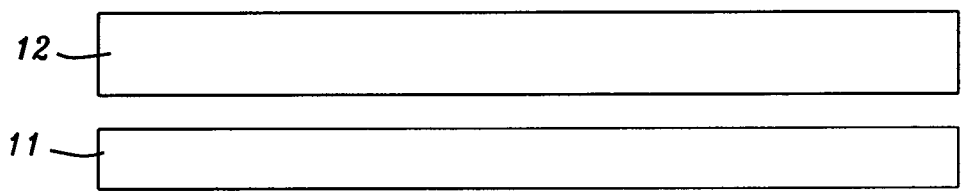
FIG. 2
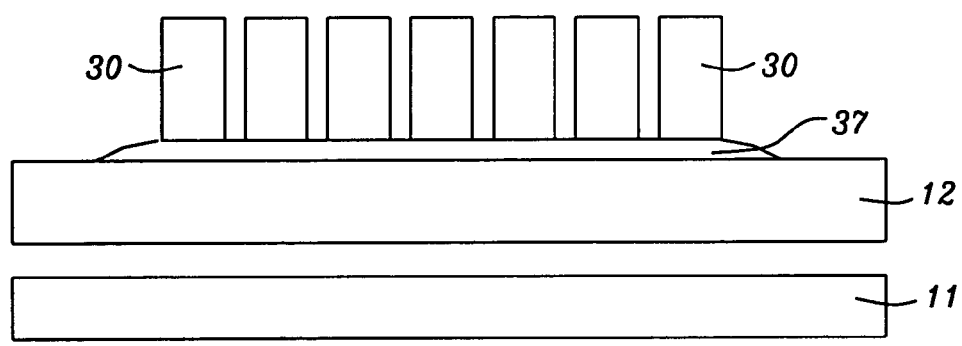
FIG. 3

LOW DC COIL RESISTANCE PLANAR WRITER

FIELD OF THE INVENTION

The invention relates to the general field of magnetic disks with particular reference to write heads for very narrow tracks.

BACKGROUND OF THE INVENTION

For high data rate writer application, one of the requirements is to have fast saturation and low inductance to induce short rise time. On the other hand, a low fly height for high areal density recording beyond 60 GB is needed in order to have better head performance. Many reliability problems are, however, associated with this low fly height. Problems such as thermal pole tip protrusion induced by thermal mismatch between alumina and pole materials during the writing process will create a head-disk interface problem and eventually will damage the read head. One of the solutions to reducing thermal pole tip protrusion is to reduce DC coil resistance of the writer so that less heat is generated during the writing process. Additionally, lower DC coil resistance improves the coil's thermal reliability.

FIG. 1 is a schematic cross-section through a typical single coil planar design of the prior art. Seen in FIG. 1 are read head lower shield 11, read head upper shield 12, write head bottom pole 13 (P1), coil insulation 14, coil pedestal 15, write gap 16, coil housing lid 17, alumina-filled trench 18, write gap layer 19, coil 20, and top pole 23.

The main drawback of this structure is its high DC coil resistance. This is a result of the prior art processes used for its manufacture. In particular, because of the small size and internal spacings of the coil, the preferred material for enclosing and electrically isolating it has been hard baked photoresist. This material is well suited to filling in tiny openings and is soft enough to accommodate volume changes due to thermal expansion when operating at maximum power. Present processes used for planarizing a cavity filled with a coil and hard baked photoresist require that a significant amount of the thickness of the coils be removed. This, in turn, increases the DC resistance of a given coil having a given number of turns leading to a degradation of its performance.

In this invention, we describe a novel coil structure with low DC coil resistance for a short yoke length planar writer.

A routine search of the prior art was performed with the following references of interest being found:

U.S. Pat. No. 6,490,131 (Sano et al) describes a device having dense windings of coil. The coil is elliptical in shape for low resistance and low heat generation. U.S. Pat. Nos. 6,385,009 and 6,262,867 (Sano et al) also disclose an elliptical coil with dense windings.

SUMMARY OF THE INVENTION

It has been an object of at least one embodiment of the present invention to provide a magnetic write head.

Another object of at least one embodiment of the present invention has been that said write head be driven by a write coil having a DC resistance less than about 5 ohms for a minimum of 7 turns.

Still another object of at least one embodiment of the present invention has been to provide a process for manufacturing said coil and write head.

These objects have been achieved by using a modified CMP process for forming and encapsulating the write coil. After formation of the coil on the floor of a suitable cavity, the cavity and coil are overfilled with photoresist which is then hard baked. CMP is terminated as soon as the coils are exposed, allowing their full thickness to be retained, resulting in minimum DC resistance. Application of this process to the manufacture of a planar magnetic write head is described.

BRIEF DESCRIPTION OF THE DRAWINGS

FIG. 1 is a cross-sectional view of a planar write head of the prior art.

FIG. 2 shows the starting point for the process of the present invention.

FIG. 3 illustrates formation of the coil.

DESCRIPTION OF THE PREFERRED EMBODIMENTS

We will now describe a process to manufacture a single coil planar magnetic write head in which the coil DCR (DC resistance) is reduced relative to similar designs described in the prior art.

Referring now to FIG. 2, the process of the present invention begins with the provision of lower magnetic shield layer 12 (most commonly a top shield of the magnetic read head portion of the full structure) and forming thereon disc 37 of dielectric material. Then, as illustrated in FIG. 3, copper coil 30 is formed on disc 37. Coil 30 has at least 7 turns and a DC resistance that is less than about 5 ohms.

The copper coil is formed by depositing a conductive seed layer (not shown) after which the location and shape for the coil are determined by means of a photoresist pattern. This is followed by the electroplating copper onto all portions of the seed not covered by photoresist to a thickness between about 1.5 and 2.5 microns. All photoresist is then stripped away and all areas of the seed layer that are not covered by copper are removed.

Figure 4:
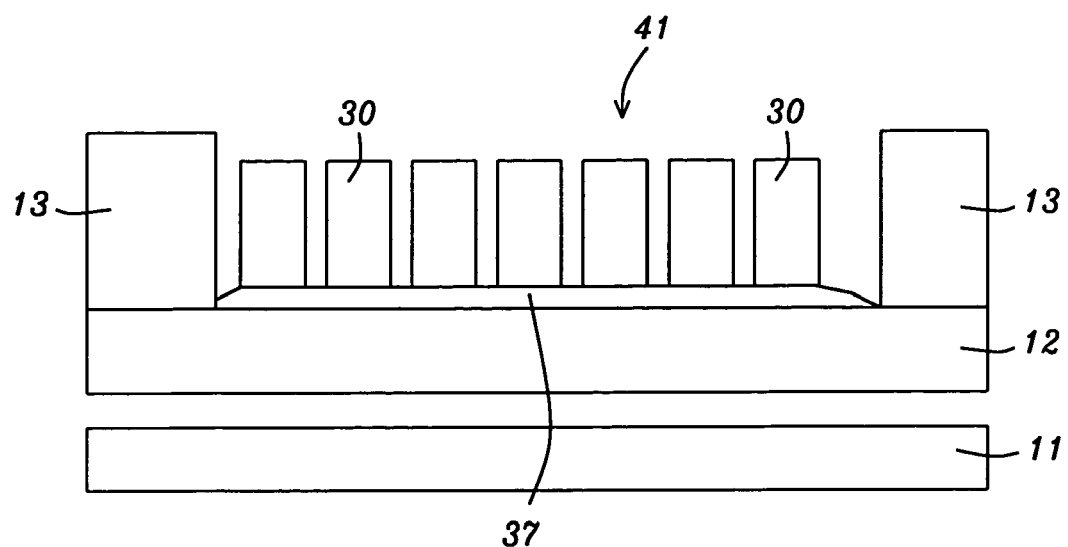
FIG. 4 shows formation of the lower pole around the coil.
Figure 5:
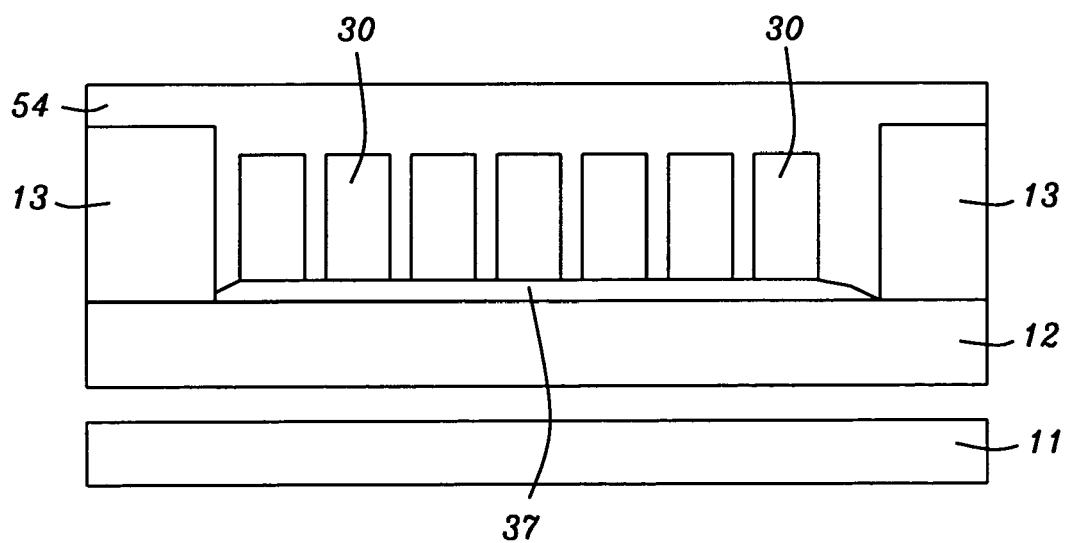
FIGS. 5–6 show the encapsulation of the coil in baked photoresist followed by a planarization process.
Figure 6:
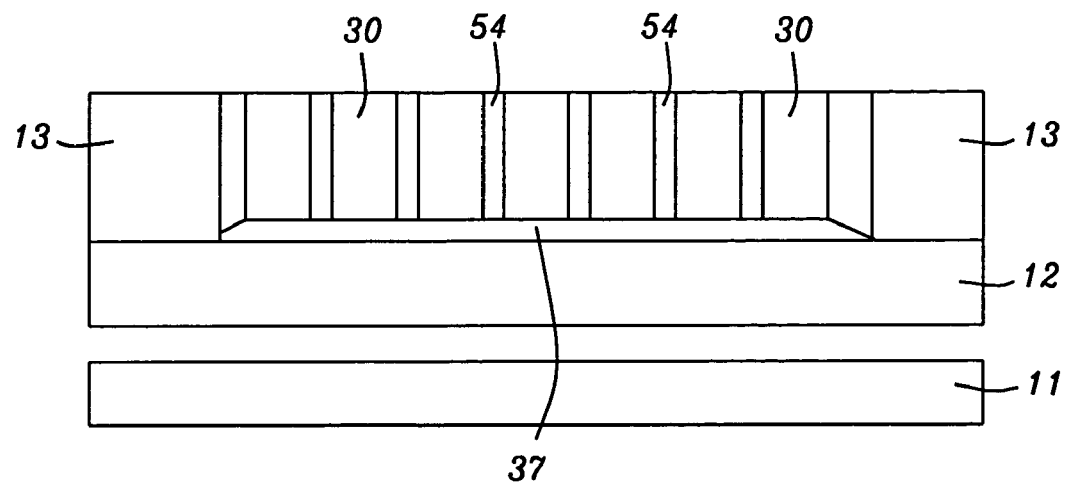

Referring now to FIG. 4, layer 13 of ferromagnetic material is deposited and then patterned to form bottom pole 13, including centrally located lower trench 41 (depth between about 2 and 4 microns). Layer 13 is typically CoFe, CoNiFe, or NiFe and it is usually deposited to a thickness between about 3 and 4 microns. Trench 41 is then overfilled with layer 54 of insulating material (FIG. 5) and then planarized so as to be level with the top surface of bottom pole 13 (FIG. 6). Thus, planarization ceases as soon as the ton surface of coil 30 is exposed, thereby ensuring that its DC resistance is not increased.

An important part of the invention is the manner in which the planarization is performed at this particular stage of the process. Once layer 54 is in place, it, and all surfaces surrounding it, are covered with an alumina layer (between about 4 and 5 microns thick), following which the structure is planarized by CMP in the usual way.

Figure 7:
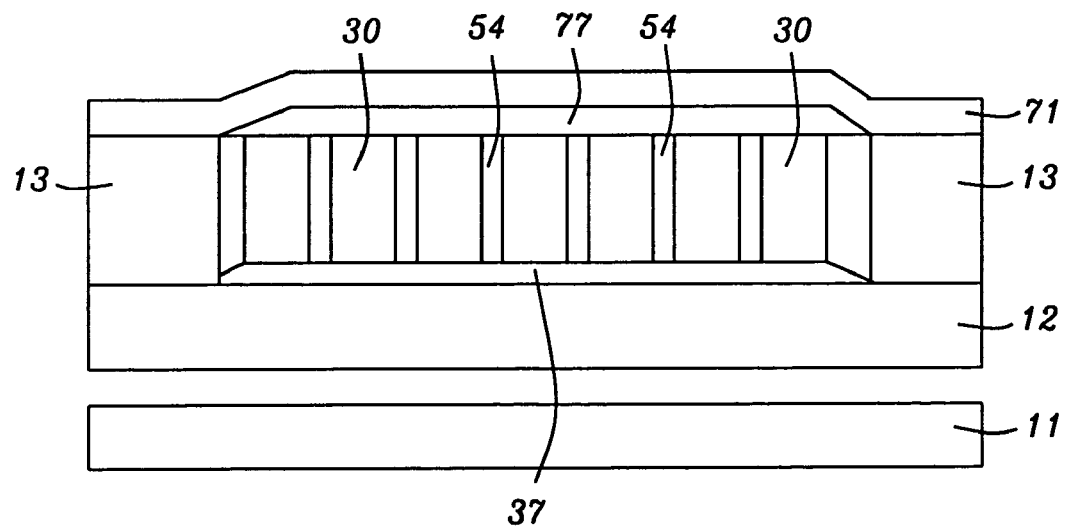
FIGS. 7–8 illustrate full enclosure of the coil.

Next, as shown in FIG. 7, insulating lid 77, that fully covers coil 30 as well as trench 41 is formed. This is followed by the deposition of high permeability layer 71 onto both lid 77 and bottom pole 13, as shown in FIG. 7. Preferred materials for high permeability layer 71 include CoFeN and it is deposited to a thickness between about 0.15 and 0.4 microns.

Figure 8:
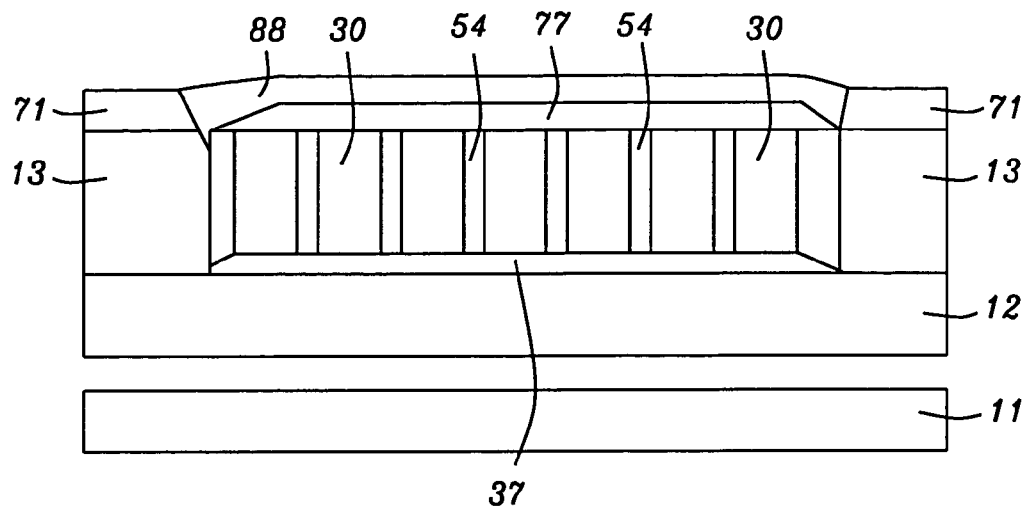

As seen in FIG. 8, layer 71 is then patterned so that it remains in contact only with lower pole 13. Then throat height defining refilled trench 88 is deposited on lid 77, following which it is then planarized so that its top surface is coplanar with the top surface of lower pole 13. Next, layer of non-magnetic material 19 is deposited and patterned so that it fully coats layer 88 but is in only partial contact with lower pole 13. In particular, the side of the lower pole that is furthest away from (i.e. opposite to) the air bearing surface (the left side for the structure in FIG. 9) remains uncovered, thus bringing about the formation of write gap 16.

Figure 9:
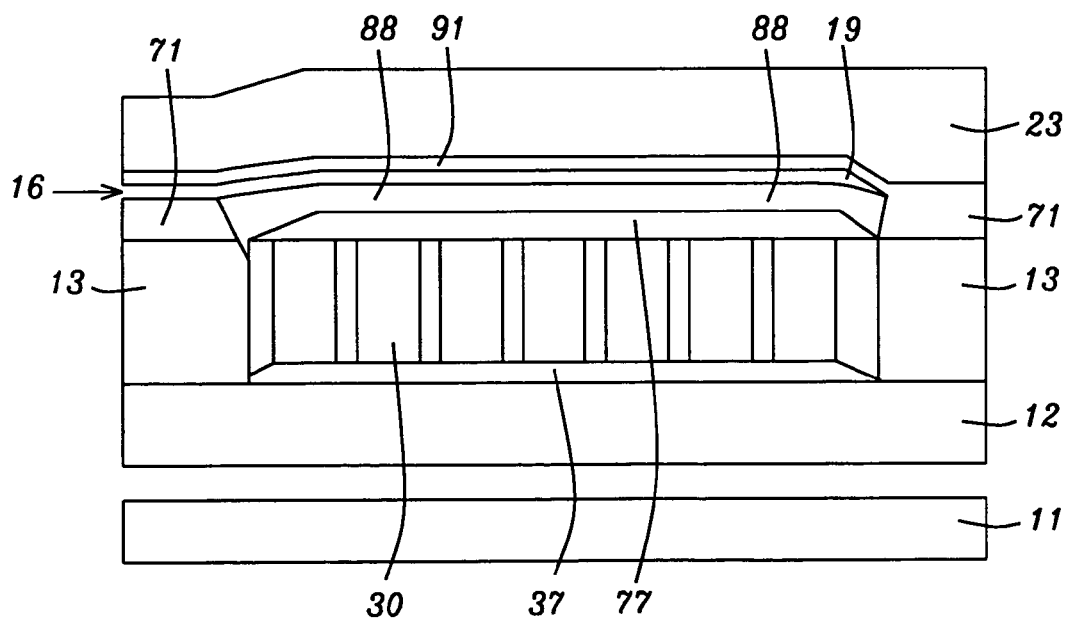
FIG. 9 shows the final structure, including the write gap and upper pole.

Continuing our reference to FIG. 9, the process of the present invention concludes with the deposition of second high permeability layer 91 onto all exposed surfaces and the formation of top pole 23 on second high permeability layer 91.

What is claimed is:

1. A process to manufacture a planar magnetic write head, having an air bearing surface, comprising:
   providing a lower magnetic shield layer;
   forming a disc of dielectric material on said lower magnetic shield layer;
   forming, on said disc, a copper coil having at least 7 turns and a DC resistance that is less than about 5 ohms;
   depositing and then patterning a layer of ferromagnetic material to form a lower pole, having a top surface, that includes a centrally located trench on whose floor rest said dielectric disc and copper coil;
   depositing a layer of baked photoresist to a thickness that is sufficient to cover said coil and to extend at least 1 micron above the top surface of the lower pole;
   by means of chemical mechanical polishing, planarizing until said copper coil and said lower pole are just exposed;
   depositing, and then patterning, an insulating layer to form a lid that fully covers said coil and said trench;
   depositing a first layer of high permeability material and then patterning said first layer of high permeability material so that it contacts only said lower pole;
   depositing and then planarizing a throat height defining layer on said lid whereby said throat height defining layer has a surface that is coplanar with the top surface of the lower pole;
   then depositing and patterning a layer of non-magnetic material to selectively coat said first layer of high permeability material and said throat height defining layer while leaving said lower pole uncovered on a side that opposes said air bearing surface, thereby forming a write gap;
   depositing a second layer of high permeability material onto all exposed surfaces, and
   then forming a top pole on said second layer of high permeability material.

2. The process recited in claim 1 wherein the step of planarizing until said copper coil is just exposed further comprises covering said layer of baked photoresist and all exposed portions of said lower pole with a layer of alumina prior to planarizing, said layer of alumina having a thickness between about 5 and 6 microns.

3. The process recited in claim 1 wherein said magnetic shield layer is a top shield of a magnetic read head.

4. The process recited in claim 1 wherein said lower pole is CoFe, CoNiFe, or NiFe.

5. The process recited in claim 1 wherein said lower pole is deposited to a thickness between about 1 and 1.5 microns.

6. The process recited in claim 1 wherein said first high permeability layer is CoFeN.

7. The process recited in claim 1 wherein said first high permeability layer is deposited to a thickness between about 0.15 and 0.4 microns.

8. The process recited in claim 1 wherein said trench has a depth between about 2 and 4 microns.

9. The process recited in claim 1 wherein said trench has a width between about 0.5 and 0.7 microns.

10. The process recited in claim 1 wherein said second high permeability layer is CoFeN.

11. The process recited in claim 1 wherein said second high permeability layer is deposited to a thickness between about 0.15 and 0.4 microns.

12. The process recited in claim 1 wherein the step of forming said copper coil further comprises:
    depositing a conductive seed layer;
    defining a location and shape for said coil by means of a photoresist pattern and then electroplating copper to a thickness between about 1.5 and 2.5 microns onto all areas not covered by said photoresist;
    stripping away all photoresist; and
    then removing all areas of the seed layer that are not covered by copper.

13. The process recited in claim 1 wherein the step of depositing a layer of baked photoresist further comprises use of spin coating.

14. The process recited in claim 1 wherein the step of depositing a layer of baked photoresist further comprises baking said layer of photoresist for about 120 minutes at a temperature between about 150 and 250° C. in an atmosphere of nitrogen.

15. The process recited in claim 1 wherein said layer of non magnetic material is alumina or ruthenium.

16. The process recited in claim 1 wherein said layer of non magnetic material is deposited to a thickness between about 0.08 and 0.15 microns.

17. A planar magnetic write head, having an air bearing surface, comprising:
    a lower magnetic shield layer;
    a disc of dielectric material on said lower magnetic shield layer;
    on said lower magnetic shield layer, a lower magnetic pole that surrounds said disc;
    on said disc, a copper coil having at least 7 turns and a DC resistance that is less than about 5 ohms;
    a layer of baked photoresist that encapsulates said coil up as far as said coil's upper surface
    an insulating layer in the form of a lid that fully covers said coil and extends therefrom as far as said lower pole;
    a first layer of high permeability material on only said lower pole;
    a throat height defining layer on said lid, said throat height defining layer having a surface that is coplanar with the top surface of the lower pole;
    a layer of non-magnetic material on said throat height defining layer and on said lower pole, except on a side of the lower pole that opposes said air bearing surface, whereby it serves as a write gap;

a second layer of high permeability material on said layer of non-magnetic material including said write gap, and on said side of the lower pole that opposes said air bearing surface; and a top pole on said second layer of high permeability material.

18. The write head described in claim 17 wherein said lower magnetic shield layer is a top shield of a magnetic read head.

19. The write head described in claim 17 wherein said bottom pole is Co, CoNiFe, or NiFe.

20. The write head described in claim 17 wherein said bottom pole has a thickness between about 1 and 1.5 microns.

21. The write head described in claim 17 wherein said high permeability layers are CoFeN.

22. The write head described in claim 17 wherein said first high permeability layer has a thickness between about 0.15 and 0.4 microns.

23. The write head described in claim 17 wherein dielectric disc material is alumina or ruthenium.

24. The write head described in claim 17 wherein dielectric disc has a thickness between about 0.08 and 0.15 microns.

25. The write head described in claim 17 wherein said second high permeability layer has a thickness between about 0.15 and 0.4 microns.

26. The write head described in claim 17 wherein said insulating lid has a thickness between about 0.1 and 0.3 microns.

27. The write head described in claim 17 wherein said insulating lid is alumina.

28. The write head described in claim 17 wherein said layer of non magnetic material is alumina or ruthenium.

29. The write head described in claim 17 wherein said layer of non magnetic material has a thickness between about 0.08 and 0.15 microns.

* * * * *